United States Patent

[11] 3,615,277

| [72] | Inventors | Kenneth G. Kreider<br>Glastonbury;<br>Eugene J. Delgrosso, Wallingford; Thomas J. Derby, Manchester, all of Conn. |
|---|---|---|
| [21] | Appl. No. | 821,378 |
| [22] | Filed | May 2, 1969 |
| [45] | Patented | Oct. 26, 1971 |
| [73] | Assignee | United Aircraft Corporation<br>East Hartford, Conn. |

[54] METHOD OF FABRICATING FIBER-REINFORCED ARTICLES AND PRODUCTS PRODUCED THEREBY
2 Claims, 2 Drawing Figs.

[52] U.S. Cl. ................................................. 29/195,
29/472.3, 29/481, 117/26, 117/128
[51] Int. Cl. ...................................................... B23p 3/00
[50] Field of Search .......................................... 29/471.9,
195, 197, 197.5, 195.5, 472.3, 472.5, 477.3, 479,
481, 502, 191.4, 191.6; 117.26, 66, 105.4, 128,
68, 93.1

[56] References Cited
UNITED STATES PATENTS

| 2,068,533 | 1/1937 | Coffman ...................... | 29/195 |
| 2,694,852 | 11/1954 | Rogers ........................ | 29/195 |
| 2,699,415 | 1/1955 | Nochtman .................... | 29/195 UX |
| 2,821,014 | 1/1958 | Miller .......................... | 29/197.5 |
| 3,153,581 | 10/1964 | Hutchins ..................... | 29/472.7 X |
| 3,406,446 | 10/1968 | Muldovan .................... | 29/197.5 X |
| 3,419,952 | 1/1969 | Carlson ....................... | 29/197.5 X |
| 3,427,185 | 2/1969 | Cheatham et al. ............. | 117/128 X |

*Primary Examiner*—John F. Campbell
*Assistant Examiner*—Ronald J. Shore
*Attorney*—John D. Del Ponti

ABSTRACT: Filaments characterized by high strength, high rigidity, and high resistance to deterioration at elevated temperatures are utilized in a process of fabricating a multilayer fiber-reinforced metal matrix composite by winding a filament on a spring-loaded mandrel covered with brazing foil, preheating the mandrel, plasma arc spraying metal matrix material in coalescent form onto the filament windings so as to form a monolayer tape, and low pressure braze bonding a plurality of such tapes together in layers, the process being characterized by a high degree of reproducibility.

PATENTED OCT 26 1971 3,615,277
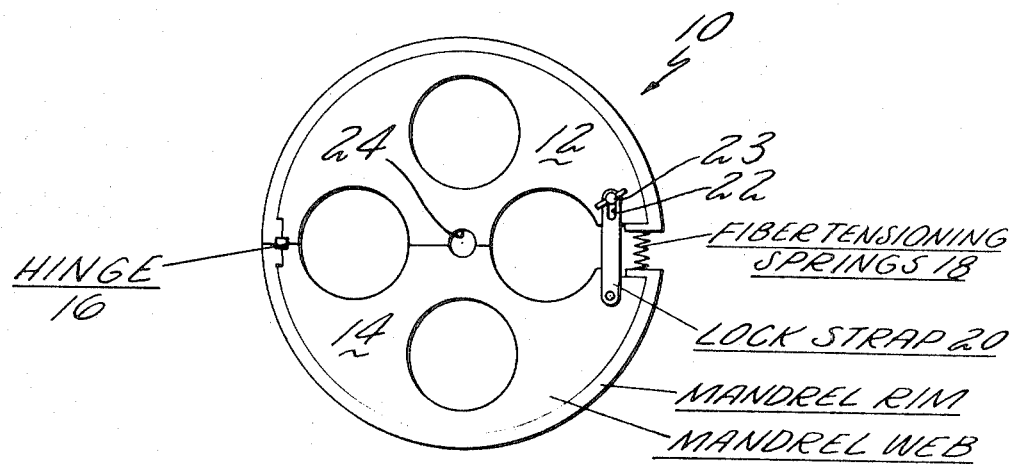
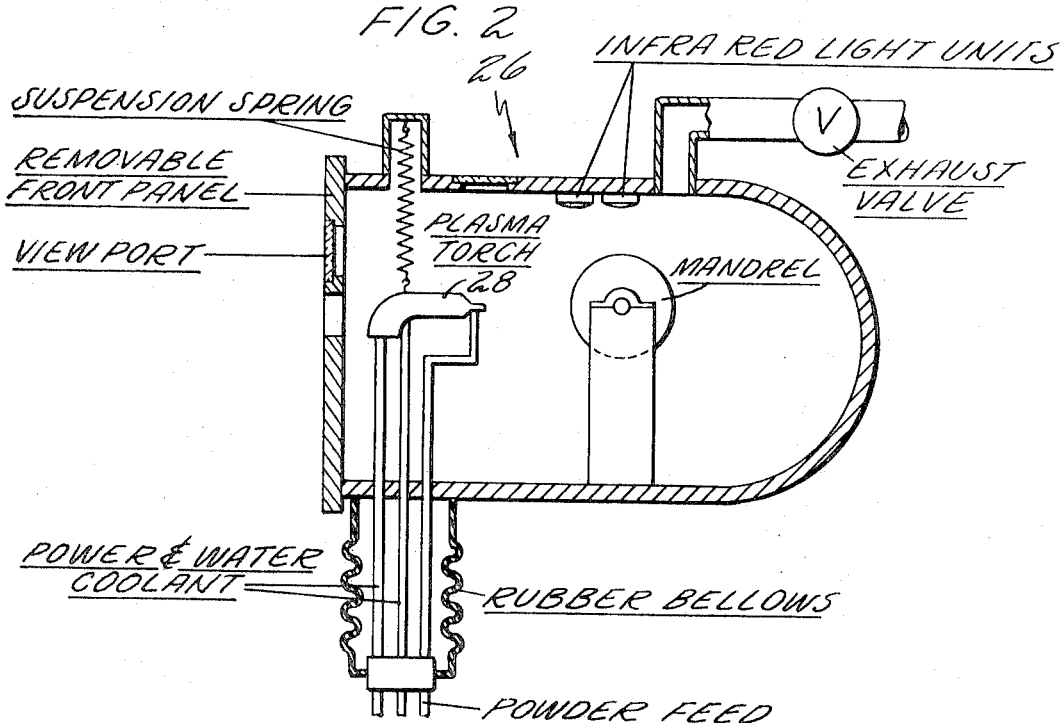
INVENTORS
KENNETH G. KREIDER
EUGENE J. DELGROSSO
THOMAS J. DEREY
BY John J. DeLuca
ATTORNEY

METHOD OF FABRICATING FIBER-REINFORCED ARTICLES AND PRODUCTS PRODUCED THEREBY

BACKGROUND OF THE INVENTION

The present invention relates to the production of fiber-reinforced composites and more particularly relates to the production of fiber-reinforced monolayer composite tapes which are low-pressure braze bondable together.

It is known that fiber strengthening offers the potential of significant improvements in the fabrication of composite structural materials designed to meet the imposing requirements of space-age hardware, The concept of fiber strengthening is based on the fact that materials produced in the fibrous form frequently exhibit a higher elastic modulus and a larger elastic strain capacity and, hence, higher stiffness and strength than the corresponding materials in bulk. The development of structural high modulus composites has received considerable attention in the past few years. Progress has been made in the development of high-strength, high-quality fibers, such as boron and silicon carbide, for example. These fibers combine the high strength of fiber glass with a high modulus and suggest the feasibility of fabricating fiber-reinforced structures having a superior balance of strength and stiffness. In order to exploit these properties, it is necessary to gather these fibers together into a composite structure in such a way that failure in several isolated fibers will not be transmitted to the surrounding fibers, and further, to distribute the load with reasonable uniformity over the entire fiber bundle. One method of effecting this result is to encase multiple layers of uniformly distributed fibers in a matrix material which will deform plastically. The achievement of such high-modulus composites having a high strength to density ratio is dependent on several primary factors.

In order to be structurally efficient, the matrix material must possess high strength and large elongation capabilities. High strength is necessary in order to transfer stresses between fibers so that discontinuous fibers are reloaded. The plastic strain capability must be high enough to resist fracture under severe localized strain, particularly at fiber fracture ends and between fiber layers. Additionally, the residual stresses in the composite caused by differences in thermal contraction between the fiber and matrix during cooling must be minimized. It has been found that the difference between the coefficients of thermal expansion of, for example, boron fibers and an aluminum matrix can result in 0.5 percent strain upon cooling from 400° F. with the matrix in residual tension.

Furthermore, it is important in a fiber-reinforced composite that the fibers be uniformly spaced in order to achieve high matrix tensile strength and uniform off axis properties. One of the most important factors for producing uniform spacing is the provision of a flat and smooth winding surface or substrate.

Finally, to be commercially feasible, a process which achieves the above-desired properties must be able to achieve them consistently so that the product composite will be highly reproducible.

One of the paramount problems in obtaining high-strength, high modulus composite articles involves the actual process of incorporating fibers into the matrix material to provide the desired end item. Several prior art processes have been employed for the fabrication of metal matrix composites. These include such techniques as molten metal infiltration, vapor deposition, electrodeposition, eutectic solidification and plasma arc spraying. One example of the latter method is described in U.S. Pat. No. 3,427,185 to Cheatham et al., which shares a common assignee with the instant invention. In that process, multiple layers of filaments are incorporated in a metal matrix by arranging a filament or mat of filaments directly on a mandrel, plasma spraying a metal matrix thereon and subsequently repeating the winding and spraying steps on each preceding composite fiber-matrix layer for the desired number of times. In other words, a multilayer composite is produced by building up alternate layers of fiber and metal matrix on each other.

Although the prior art processes result in fiber-reinforced metal matrix composites of increased strength to density ratios, their structural efficiency is impaired by a relatively weak bonding between composite layers, particularly where there is a high fiber volume fraction, and by residual stress concentrations caused by different coefficients of thermal expansion for the fibers and the matrix which are difficult to control with respect to uniformity and severity. Furthermore, fiber spacing, which is apparently critical in off axis strength, is uneven because the substrate for the filament winding is not flat after several layers have been built up. Still further, the prior art processes are difficult to pursue when attempting to made multilayered composites of complex shape since the ability to wind monofilaments to such a shape with the requisite degree of uniformity is greatly limited. On a broad scale then, there is a serious reproducibility problem associated with the above techniques which stems basically from an inability to insure that the filaments and hence the matrix material will be provided in the same location, in the same quantity, and in the same quality in each article. Quite to the contrary, articles produced by the foregoing methods may vary significantly with respect to their physical properties despite the most careful attention to process details.

SUMMARY OF THE INVENTION

The present invention relates to fiber-reinforced articles and, more particularly, to an improved process for fabricating such articles to provide a maximum and uniform fiber fill, as desired, and impart reproducibility to the fabrication from one article to the next. It contemplates the use of filaments as, for example, boron, silicon carbide or boron coated with silicon carbide and a metal matrix material as for example aluminum to make monolayer tapes which are easily handled and highly reproducible. The tapes are preferably integrated into a multilayer composite of extreme cross-sectional uniformity.

In accordance with one aspect of the present invention, a multilayer composite is produced from a plurality of single layer plasma sprayed tapes which are each fabricated on a substrate under identical circumstances with respect to stress and temperature. A single filament is wound in helical collimated relation on a mandrel which is covered with brazing foil. The filament is uniformly tensioned and preheated to a predetermined level and a metal matrix material is applied by plasma arc spraying. The resulting tapes possess excellent filament-matrix bonding characteristics with no signs of fiber degradation and are preferably formed into a multilayer composite of the desired shape by consolidating the requisite number of tapes together in layers and subjecting them to a low-pressure braze bonding operation.

By means of the present invention, not only is the production of easily handleable high modulus monolayer composite tapes attained, but composite tapes so produced are extremely uniform and highly reproducible. Furthermore, composite tapes so produced are readily amenable to defect and structure examination by NDT method. One of the most significant advantages of the present invention resides in its versatility and great potential in applications directed toward the production of large scale multilayer components. The utilization of a braze foil substrate in the manufacture of monolayer tapes, obviates the need for diffusion bonding techniques and the extremely high pressures necessary therein. The braze bonding technique is particularly amenable to the production of composites of great dimensional magnitude since it can be performed with readily available production presses. The requirement for uniform pressure over the entire area to assure good densification is, in comparison, easily achieved particularly for large area components, by utilization of monolayer tapes which incorporate a brazing layer since all voids are readily filled by the braze material at the brazing temperature. The process is simple and inexpensive, and yields precisely spaced fibers with a minimum of residual stress in the composite. Strong fiber-matrix bonding is achieved without fiber degradation and the technique of producing, as an intermediate product, monolayer tapes, resolves the problem of monofilament handling and permits the fabrication of large and complex parts with ease. Since the correct filament-matrix volume ratio may be established prior to the tape laying step, variations in the ratio as a result of unavoidable variations in technique are minimized. As a consequence of the teachings herein, a unique metal matrix composite is achieved in a manner heretofore unknown.

BRIEF DESCRIPTION OF THE DRAWINGS

FIG. 1 is a side elevational view of a mandrel suitable for use during composite fabrication; and FIG. 2 is a side elevational view, partly in section, of a plasma spray chamber.

DESCRIPTION OF THE PREFERRED EMBODIMENTS

Referring now to the drawings, wherein like numerals indicate like parts, the numeral 10 designates a hollow, cylindrical, diametrically split mandrel comprised of a pair of matching semicylindrical pieces 12 and 14. The mandrel pieces are secured together at their interface by a hinge 16 at one end and are pivotally separable to a controlled degree by means of a pair of springs 18 and a locking strap 20 located at the opposite end. The strap 20 is provided with a longitudinal slot 22 adjacent one end. A thumbscrew 23, having an enlarged head, is suitable received in the slot 22 and is operable to lock the mandrel in a spring-expanded position. The mandrel 10 has a central axial passageway 24 adapted for receipt of an appropriate driving shaft (not shown) so that the mandrel is both rotatable and axially movable.

According to the practice of the invention, with the springs biasing the pieces outwardly, the mandrel is locked in the open position and a selected sheet of metal brazing foil is laid in a single layer in covering relation over the entire cylindrical surface thereof in a smooth and uniform manner. In order to prevent wrinkling during fabrication, the foil is preferably of a material which is thermally compatible with the mandrel, that is, it must have a coefficient of expansion which is substantially the same therewith. Further, the foil should have excellent brazing characteristics with respect to the plasma sprayed matrix material. One of the advantages of using the foil as a substrate material is the fact that it improves the handling characteristics of the monolayer tape and gives it a significantly increased degree of toughness. As explained hereinafter, the foil is made adherent to the fibers and is subsequently incorporated into the matrix material.

Filamentary material is selected and wound in closely laid, evenly spaced helical convolutions on the foil. This can be accomplished by drawing continuous filament from a supply reel, securing the end of the filament adjacent the side of the mandrel, and guiding the filament under winding tension, by suitable pay off means while the mandrel is rotated. The exact mechanism by which the fiber is laid on the foil substrate is not considered part of the present invention and those skilled in the art will recognize that there are many alternative schemes for placing filaments, in tension, on a mandrel in a collimated manner. By the term collimated is meant the state wherein adjacent fiber lengths are evenly and uniformly spaced from each other and such a concept is equally applicable to a single fiber helically wound on the mandrel or a plurality of fibers wound on the mandrel and residing in parallel planes.

Upon completion of the winding, the filament is broken and affixed to the mandrel and the restraining strap 20 is released. The mandrel is then positioned in a plasma spray chamber 26 where deposition of the metal matrix material by means of a plasma torch 28 can be accomplished in an argon atmosphere. Prior to spraying, the mandrel, metal foil and wound filaments are preheated to a temperature sufficiently high to assure bonding to the matrix during plasma spraying. The actual heating is accomplished both by infrared lighting and by the plasma torch. It has been determined that a preheat temperature between 400° and 600° F. results in good adherence while a temperature below 200° F. results in nonadherence. During spraying, the mandrel is rotated and traversed in front of the stationary plasma arc in order to obtain an even layer of matrix material. Variables which affect the plasma flame are the power input to the arc, the geometry and size of the arc electrodes, and the composition and flow rate of the plasma gas. Deposits were made with 400–500 amperes, 30–35 volts, and 140–160 cu. ft./hr. STP of argon. In addition to these variables, the deposit is affected by controlling the rate of powder feed, the position of the powder feed inlet hole of the plasma, the size distribution of the powder, the torch to substrate distance, the nature of atmosphere surrounding the plasma exhaust flame and the substrate, and the substrate temperature. Composites were made with a moderate feed rate with respect to saturation (3 pounds per hour of metal powder spray), the powder inlet located in the ionizing zone of the arc, −240+400 mesh size spherical metal powder, a four to five inch arc to substrate distance, an argon atmosphere, a substrate temperature of 400°–600° F. and a relative velocity of the plasma spray arc across the substrate of two to eight inches per second.

The instant technique of preheating and plasma spraying not only causes the coalescent particles of matrix metal to encase the fibers and adhere to them, but at the same time causes the mandrel to thermally expand so as to operate against the bias of springs 18 and cause the mandrel pieces 12 and 14 to close. The mechanical contraction of the thermally expanding mandrel minimizes the variations of tensile strain to which the filaments would otherwise be subject. When the spraying is complete, the tape and the mandrel are cooled to room temperature and during the cooling process, the opposite compensatory mandrel action occurs. The thermally contracting mandrel is mechanically expanded by the action of the springs 18 so that the difference between the coefficients of thermal expansion of the fibers and matrix is accounted for. In all, the fibers are subjected to not greater than 0.3 percent strain at spraying temperature.

After cooling, the monolayer tape is removed from the mandrel by cutting in the desired manner. The tape may for example, be severed transversely so as to form a flat tape having dimensions of the width and girth of the mandrel or alternatively, in the form of a helix having dimensions of width narrower than the width of the mandrel and of length longer than the girth of the mandrel.

Once the tape is removed, it is preferably subjected in general, along with other like tapes, to a secondary fabrication technique. In particular, the monolayer tapes are low pressure braze bonded in a nonoxidizing atmosphere. The desired number of tapes are laid up, one upon the other, between steel platens or dies and are subjected to an elevated temperature until the foil is incorporated into the sprayed matrix and the required densification is achieved.

Various experiments were conducted to establish the efficiency of the techniques hereinbefore described. During the practice of the invention, an aluminum mandrel 6 inches wide and 20 inches in diameter was provided with a pair of autovalve springs, each having a spring constant of 900 lb./in. The strap 20 was operable to lock the mandrel at a maximum separation distance of ¼ inch. Aluminum matrix materials were at various times applied to boron, silicon carbide and silicon carbide coated boron filaments. It is to be understood that general usage herein of the terms aluminum includes reference not only to the pure metal but also to the respective aluminum-base alloys. Some of the fiber and powder and foil matrix materials found suitable for use in the fabrication of composites according to the instant invention are set forth in table I.

TABLE I

Materials for Braze Composite Fabrications

| Fiber | Diameter In inches | Modulus $10^6$ psi | Average Ultimate Tensile Strength psi | Source |
|---|---|---|---|---|
| Boron | .0039–.0041 | 55–60 | 425,000 500,000 | United Aircraft Research Labs (UARL) |
| Boron with .00010 to .00015 inch SiC | .0039–.0041 | 55–60 | 425,000 500,000 | UARL |

TABLE I—Continued

| coating (BORSIC™) | | | | |
|---|---|---|---|---|
| SiC | .0025–.0033 | >50 | 275,000 400,000 | UARL |

| Brazeable Alloy (Powder) | Type | Size Range | Source |
|---|---|---|---|
| 1100—Commercially pure Aluminum | Speroidized | 15–44 Micron | Thermal Dynamics |
| 6061 Aluminum Alloy (1.0% Mg, 0.5% Si, Bal Al) | Atomized | −270+400 mesh | Reynold's Metal Co. |

| Brazing Alloy (Foil) | | Thickness | Source |
|---|---|---|---|
| 713 (7.5% Si, 0.8% Fe, Bal Al) | | 0.001–0.002 | Alcoa |
| 718 (12% Si, Bal Al) | | 0.001–0.002 | Alcoa |

Of course, many other combinations of fiber, brazeable alloy and brazing alloys appear suitable. Such other brazeable aluminum alloys as 3003, 3004, 5005, 5050, 6062, 6063, 6951, etc. and brazing alloys as those having Aluminum Association Designation 4043, 4045, 4145, 4245, etc., are appropriate. It should be noted however, that the usage of reinforcing fibers, such as those listed above is not intended to be restricted solely to an aluminum system. The fibers may be incorporated into other metal alloy systems as will be appreciated by those skilled in the art wherein the alloy can be brazed at temperatures lower than those at which fiber degradation occurs.

It is possible for example to use, in a manner similar to the aluminum system described herein, alloy systems such as titanium, nickel, low alloy steels and high carbon steels, stainless steels, magnesium, the superalloys, copper and brass, tungsten, molybdenum, columbium, and tantalum. Particular utility is indicated in the fiber reinforcement of light metals. A suitable brazing alloy for titanium and its alloys for example, is Ti-15Ni15Cu or Ti-48Zr-4Be while a suitable brazing alloy for magnesium is American Welding Society –ASTM designation BMg-1 and BMg-2.

It is recognized also that the brazing alloy need not be applied in foil form. The brazing alloy may be plasma sprayed onto the filaments with the brazeable alloy in the foil form. So long as the brazing alloy has a melting point below that of the brazeable alloy and the fiber is not subject to degradation during the process, satisfactory composites can be made.

Considerable fabrication development was performed utilizing a system of 0.001 inch thick foil of 713 aluminum braze alloy, plasma sprayed 6061 aluminum alloy powder, and BORSIC fiber. In one investigation, tapes consisting of BORSIC fiber (normal diameter 4 mils) were wound at 185 turns/inch on 0.001 inch thick 713 braze foil (composition by weight: 7.5 Si, 0.8 Fe, 0.2 Zn, 0.1 Mg, Bal Al) and sprayed with a 6061 aluminum alloy matrix. The tapes were braze bonded in an argon atmosphere for 10–30 minutes at 590°–600° C. at pressures ranging from 15 to 400 p.s.i. The initial thickness of the tapes prior to hot pressing was 9.7 mils with a tape density of 0.20 grams/in$^2$. The limiting point of compaction was 5 mils/layer. Similar results obtained when the braze bonding occurred in a vacuum and the use of either argon or vacuum is far superior to bonding in air which results in undesirable oxidation.

In further investigations, consolidation and compaction of the braze bondable tapes was compared with hot press bondable tapes. Both tapes were made by the same process, with the braze bondable tape utilizing one mil 713 alloy foil and the hot press bondable tape instead incorporating one mil 6061 alloy foil. The monolayer tapes were produced in 5 feet long, 6 inch wide strips and were cut into 6 inch by 6 inch sheets and laid up upon each other as indicated in the tables below. In order to prevent oxidation, the tapes were cleaned with an acetone rinse. The stacked tapes were then braze bonded together in an oxidation-free environment, i.e., either in vacuum or argon without flux or in a commercially available stainless steel envelope (SEN-PAK) containing a material suitable for gettering contaminating gases. The tape stacks were then placed between heated dies. The braze bondable tapes were heated at approximately 540° C. for 15 minutes under a low pressure as set forth below and then, in the braze cycle, heated at 590°–600° C. for 15 more minutes at the same pressure. The braze cycle causes infiltration, liquid phase sintering, and incipient melting of the 6061 which has a solidus temperature of 582° C. The consolidation is, of course, enhanced by the pressure applied to the composite during the heat treatment. It will be appreciated that the temperature during the braze cycle must be carefully controlled to avoid excessive melting of the 6061 alloy and resulting uneven fiber spacing in the final product.

Braze bonded multilayer composites produced by the foregoing techniques were subjected to mechanical property evaluation, the results of which are set forth in table II.

TABLE II.—MECHANICAL PROPERTIES OF BRAZED COMPOSITES

| Specimen No. | Pressure during brazing, p.s.i. | Number of tape layers | Axial to transverse tape ratio [1,2] | Orientation of tapes in composite [3] | Volume percent fiber | Ultimate tensile strength, K s.i. | Young's modulus, $10^6$ p.s.i. | Strain at fracture, percent |
|---|---|---|---|---|---|---|---|---|
| 1 | 15 | 5 | | 5A | 50 | 145 | 30 | .49 |
| | | | | | | 140 | 29 | .48 |
| | | | | | | 125 | 28 | .43 |
| | | | | | | 117 | 27 | .45 |
| 2 | 25 | 5 | | 5A | 54 | 141 | 36 | .45 |
| | | | | | | 143 | 35 | .46 |
| | | | | | | 157 | 35 | .55 |
| | | | | | | 154 | 37 | .47 |
| 3 | 50 | 5 | | 5A | 52 | 147 | 31 | .46 |
| | | | | | | 137 | 33 | .42 |
| 4 | 100 | 8 | | 8A | 52 | 160 | | |
| | | | | | | 124 | 26 | |
| | | | | | | 126 | 30 | |
| | | | | | | 140 | | |
| 5 | 200 | 8 | | 8T | 41 | 15.1 | | |
| | | | | | | 15.4 | | |
| 6 | 200 | 10 | 80/20 | 4A-2T-4A | 52 | 111 | 25 | .52 |
| | | | | | | 108 | 28 | .52 |
| | | | | | | 90 | 30 | .42 |
| | | | | | | 96 | 22 | .44 |
| 7 | 400 | 10 | 60/40 | 3A-4T-3A | 50 | 87 | 19 | .50 |
| | | | | | | 85 | 18 | .52 |
| | | | | | | 83 | 19 | .48 |
| | | | | | | 91 | 20 | .49 |
| 8 | 200 | 10 | 20/80 | 4T-2A-4T | 47 | 21 | 8 | .42 |
| | | | | | | 21 | 10 | .39 |
| | | | | | | 19 | 8 | .38 |
| | | | | | | 23 | 9 | .37 |

[1] Fibers in axially oriented tape parallel to tensile test direction.
[2] Fibers in transversely oriented tape perpendicular to tensile test direction.
[3] A=axially oriented tape, T=transverse oriented tape.

It should be noted that typical properties of diffusion bonded multilayer composites with 50 percent by volume Borsic in a 6061 aluminum matrix include: axial strength of 170,000 p.s.i.; axial modulus of 33 ×10⁶ p.s.i.; transverse strength of 18,000 p.s.i.; and transverse modulus of 19 ×10⁶ p.s.i.

From the foregoing and other tests, it was found that complete compaction was achieved by the braze bonding technique. Metallographically, no significant evidence of porosity was observed in multilayer composites fabricated by the braze bonded method. In summary, it can be seen that the mechanical properties of the braze bonded aluminum alloy matrix composites generally approach those of diffusion bonded composites for both unidirectional as well as cross ply configurations.

It will be appreciated from the foregoing that braze bondable monolayer tapes are greatly advantageous, particularly when it is considered that dense multilayer composite structures can be made at pressures ranging from 15 to 400 p.s.i. in contrast to diffusion bondable tapes which usually require pressures of 2,000 p.s.i. and higher.

In the practice of the present invention, it is recognized that several other modifications can be made. It is recognized for example, that plasma spraying can be performed in air in order to promote a simpler and less expensive technique. Composites from tapes sprayed in air were diffusion bonded with up to twenty layers in thickness. There is no significant difference noted in the microstructures of these composites as compared to those sprayed in argon. The properties of these composites are also found to be nearly equivalent to those fabricated in an argon atmosphere.

It is also recognized that the present technique is not limited to the fabrication of braze bondable monolayer tapes by the incorporation of a brazing foil substrate. As indicated hereinbefore, an alternative method of practicing the technique includes adding the brazing alloy as a plasma spray coating, with the brazeable alloy applied as either a plasma spray coating also or as a foil backing. So long as a brazing alloy and a brazeable alloy are combined to form a matrix material for the filaments whereby, during brazing, the brazeable alloy maintains fiber collimation while the brazing alloy allows fabrication and bonding at low pressures, the inventive concept pertains.

It will be readily seen that, through the use of the techniques hereinbefore described, fiber-reinforced articles of high quality can readily and reproducibly be fabricated. While the invention has been described with reference to specific examples, fabrication parameters and materials, these embodiments and conditions are intended to be illustrative only. Various modifications and alternatives, other than those already mentioned, will be readily evident to those skilled in the art within the true spirit and scope of the invention as set forth in the appended claims.

1. A fiber strengthened metallic composite tape material comprising:
   a brazing metal foil layer,
   a plurality of high strength high modulus reinforcing filaments contiguous to one face of said foil layer, said filaments being substantially uniformly spaced apart and aligned with each other along the tensile axis of the composite metallic material; and
   a plasma sprayed brazeable metal layer bonded to said filaments and said one face of the foil layer, said filaments being bonded to both the brazing metal layer and the plasma sprayed metal layer,
   said brazing layer having a melting point lower than that at which fiber degradation occurs and below that of the plasma sprayed metal layer.

2. The invention of claim 1 wherein said brazing metal foil is an aluminum brazing alloy, the filaments are selected from the group consisting of boron, silicon carbide and silicon carbide coated boron, and the plasma sprayed brazeable metal layer is aluminum or an alloy thereof.

\* \* \* \* \*